(12) United States Patent
Georgiev

(10) Patent No.: US 7,961,970 B1
(45) Date of Patent: Jun. 14, 2011

(54) METHOD AND APPARATUS FOR USING A VIRTUAL CAMERA TO DYNAMICALLY REFOCUS A DIGITAL IMAGE

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 38 days.

(21) Appl. No.: 12/604,271

(22) Filed: Oct. 22, 2009

Related U.S. Application Data

(63) Continuation of application No. 11/291,555, filed on Nov. 30, 2005, now Pat. No. 7,623,726.

(51) Int. Cl.
 *G06K 9/40* (2006.01)
(52) U.S. Cl. ......... 382/255; 345/421; 345/422; 345/582
(58) Field of Classification Search .................. 345/421; 382/255
 See application file for complete search history.

(56) References Cited

U.S. PATENT DOCUMENTS

| | | | |
|---|---|---|---|
| 4,731,864 A * | 3/1988 | Modla ........................... | 382/255 |
| 4,897,806 A | 1/1990 | Cook et al. | |
| 5,025,394 A | 6/1991 | Parke | |
| 5,025,400 A | 6/1991 | Cook et al. | |
| 5,239,624 A | 8/1993 | Cook et al. | |
| 5,594,676 A | 1/1997 | Greggarin et al. | |
| 5,809,219 A | 9/1998 | Pearce et al. | |
| 6,590,574 B1 * | 7/2003 | Andrews ........................ | 345/419 |
| 6,640,014 B1 | 10/2003 | Price et al. | |
| 2003/0001906 A1 * | 1/2003 | Light et al. ..................... | 345/849 |
| 2005/0231603 A1 | 10/2005 | Poon | |
| 2005/0232507 A1 | 10/2005 | Simmer | |
| 2005/0243178 A1 | 11/2005 | McConica | |
| 2007/0252074 A1 | 11/2007 | Ng et al. | |
| 2009/0102841 A1 * | 4/2009 | Clavadetscher ............... | 345/420 |

OTHER PUBLICATIONS

Aaron Isaksen, et al., "Dynamically Reparameterized Light Fields," Proceedings of ACM SIGGRAPH 2000, Computer Graphics Proceedings, Annual Conference Series, Jul. 2000, pp. 297-306.

* cited by examiner

*Primary Examiner* — Gregory F Cunningham
(74) *Attorney, Agent, or Firm* — Robert C. Kowert; Meyertons, Hood, Kivlin, Kowert & Goetzel, P.C.

(57) ABSTRACT

One embodiment of the present invention provides a system that dynamically refocuses an image to simulate a focus plane and a depth-of-field of a virtual camera. During operation, the system receives an input image, wherein the input image includes depth information for pixels in the input image. The system also obtains parameters that specify the depth-of-field d and the location of the focus plane for the virtual camera. Next, the system uses the depth information and the parameters for the virtual camera to refocus the image. During this process, for each pixel in the input image, the system uses the depth information and the parameters for the virtual camera to determine a blur radius B for the pixel. The system then uses the blur radius B for the pixel to determine whether the pixel contributes to neighboring pixels in the refocused image.

20 Claims, 3 Drawing Sheets

METHOD AND APPARATUS FOR USING A VIRTUAL CAMERA TO DYNAMICALLY REFOCUS A DIGITAL IMAGE

This application is a continuation of U.S. application Ser. No. 11/291,555, which was filed on Nov. 30, 2005 now U.S. Pat. No. 7,623,726.

BACKGROUND

1. Field of the Invention

The present invention relates to computer-based tools for manipulating digital images. More specifically, the present invention relates to a method and an apparatus for dynamically refocusing a digital image to simulate changing the focus plane and the depth-of-field of a "virtual camera."

2. Related Art

Dramatic increases in computational power in recent years make it possible to perform a wide range of sophisticated computational operations on digital images. In particular, there are presently a number of techniques for using three-dimensional information to produce images that create a feeling of three-dimensional depth.

Blur filters are sometimes used to selectively defocus an image (or parts of an image) to simulate defocus and change of focus, thereby creating a feeling of three-dimensionality. However, existing blur filters only approximate the physics behind defocus and change of focus operations and as a result often produce unrealistic looking results.

Warping techniques use stereo or multiple-view geometry to distort an image to create the effect of a camera moving through space. However, artifacts are often created during the warping process due to a sparse or imperfect warping mesh. Consequently, in practice it is hard to produce convincing three-dimensional results without hard work to establish a dense correspondence mesh of good quality.

Light-field techniques typically involve taking pictures with an array of 64 or more cameras and then building a large database representing all rays in three dimensions along with their associated colors. A light-field image can then be produced by performing a search through the large database of rays, which can be a very slow process. Furthermore, artifacts are often created due to not being able to represent rays that fall between cameras (see A. Isaksen, L. McMillan and S. Gortler, "Dynamic Reparameterized Light Fields," Proceedings of SIGGRAPH 2000.)

Hence, what is needed is a method and an apparatus for using three-dimensional information to produce images that create a feeling of three-dimensional depth without the above-described problems.

SUMMARY

One embodiment of the present invention provides a system that dynamically refocuses an image to simulate a focus plane and a depth-of-field of a virtual camera. During operation, the system receives an input image, wherein the input image includes depth information for pixels in the input image. The system also obtains parameters that specify the depth-of-field d and the location of the focus plane for the virtual camera. Next, the system uses the depth information and the parameters for the virtual camera to refocus the image. During this process, for each pixel in the input image, the system uses the depth information and the parameters for the virtual camera to determine a blur radius B for the pixel. The system then uses the blur radius B for the pixel to determine whether the pixel contributes to neighboring pixels in the refocused image.

In a variation on this embodiment, determining the blur radius B for a given pixel involves: determining an inverse depth $1/R$ for the given pixel; determining an inverse distance to the focus plane $1/F$ for the given pixel; and calculating B for the given pixel by computing $B=(1/R-1/F)/d$.

In a variation on this embodiment, using the blur radius to determining whether a given pixel contributes to a neighboring pixel involves: determining a distance D from the given pixel to the neighboring pixel; if $D>B$, determining that the given pixel does not contribute to the neighboring pixel; and otherwise if $D \leq B$, determining that the given pixel contributes to the neighboring pixel.

In a further variation, determining the distance D from the given pixel to the neighboring pixel involves obtaining the distance D from a lookup table based on relative pixel offsets between the given pixel and the neighboring pixel.

In a variation on this embodiment, producing a given pixel in the refocused image involves generating a kernel K for the given pixel, wherein the kernel K uses the blur radius of neighboring pixels to determine whether the neighboring pixels contribute to the given pixel. It then involves applying the kernel K to the given pixel and the neighboring pixels in the input image to produce the given pixel in the refocused image.

In a variation on this embodiment, generating the kernel K additionally involves normalizing elements of the kernel K so that the elements collectively add up to one.

In a variation on this embodiment, while producing the refocused image the system visits each pixel in the input image in sequence. While doing so, the system calculates the contribution of the pixel in the input image to neighboring pixels in the refocused image based on the blur radius B of the pixel. The system then adds the calculated contributions of the pixel in the input image to a running total maintained for each neighboring pixel in the refocused image.

DETAILED DESCRIPTION

Figure 1:
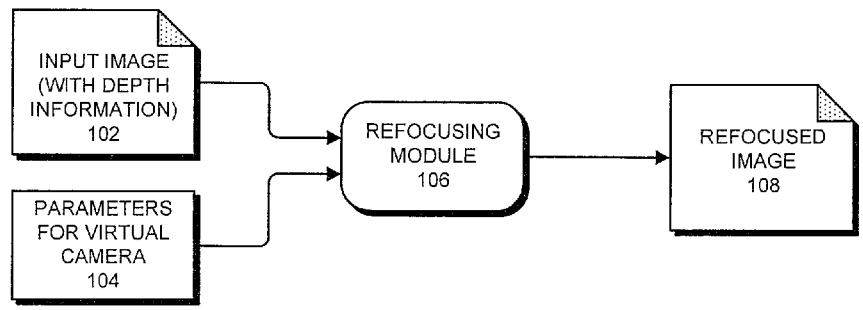
FIG. 1 illustrates how an input image is converted into a refocused image in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Overview

One embodiment of the present invention highlights the three-dimensionality of a scene by dynamically changing the focus of a "virtual camera" which operates on the scene. This camera is referred to as "virtual" because it is implemented in software and because it operates on images after the images have been captured by a camera. The virtual camera can focus on any plane (or arbitrary surface) in three dimensions, with objects appearing out of focus when they are away from this plane. The out-of-focus appearance is proportional to the distance from the focus plane, exactly as in real life cameras.

The focus plane can be dynamically changed in real time (for example, by using a slider) just as a photographer changes the focus of his camera while looking at the object. However, now, refocusing is done in the studio, after taking the picture, and this refocusing can be better tailored to specific needs of the end-user.

Furthermore, the depth-of-field of the virtual camera can be freely controlled. This enables the aperture to be increased beyond possible apertures of real physical cameras, for example a virtual aperture can be as big as a building.

In real life, the three-dimensional point that is responsible for a given pixel will be seen from a number of viewpoints on the camera aperture. The present invention essentially integrates over all of these points taking into account the shape of the aperture, and optionally a weighting function over the aperture. In this way, the present invention achieves special "de-focus blur" for each pixel depending on the depth (distance to that three-dimensional point) of the pixel in a way that is closely related to what happens in real life. Note that this method operates without explicitly using any three-dimensional geometry or three-dimensional model; the method is completely image based.

While integrating over the aperture, the present invention takes into account information about the location of the focus plane, as specified by the user. In doing so, it does not explicitly calculate multiple pictures from different viewpoints on the aperture, which would be a very time consuming approach. Instead, the present invention implicitly does the equivalent thing based on a specially-designed kernel, which is different for each pixel. This kernel is also responsible for simulating the exact location of the virtual focus plane in the resulting final image. This location can be derived from the geometry of the four-dimensional space of all rays in three-dimensions.

Producing a Refocused Image

FIG. 1 illustrates how an input image 102 is converted into a refocused image 108 in accordance with an embodiment of the present invention. This embodiment starts with input image 102, which also contains depth information. For example, each pixel in input image can be associated with a depth value, which specifies a depth of the pixel. The depth values for pixels associated an object can be gathered in a number of ways. The system can use two or more images of a set of objects taken from different viewpoints to triangulate the positions of the objects. Alternatively, infra-red range-finding techniques can be used to determine the position of the objects. Additionally, depth information can be extracted from a video sequence taken by a camera that is moving through space (based on multiple view geometry).

The illustrated embodiment of the present invention also starts with parameters 104 for the "virtual" camera. These parameters can include the depth-of-field d for the virtual camera, as well as a location for a "focus plane" for the virtual camera. The focus plane is a plane in three-dimensional space which defines where the virtual camera is "in focus". Objects on (or close to) the focus plane appear sharp and clear in the resulting image, whereas objects far from the focus plane appear blurred in the resulting image. (Note that a focus plane of a camera is not the same as a "focal plane" of the camera. The "focal plane" of a camera is a plane located within the camera where an image is focused.)

Refocusing module 106 simulates the operation of the virtual camera on input image 102 to produce refocused image 108. The operations performed by refocusing module 106 described in more detail below.

Virtual Camera

Figure 2:
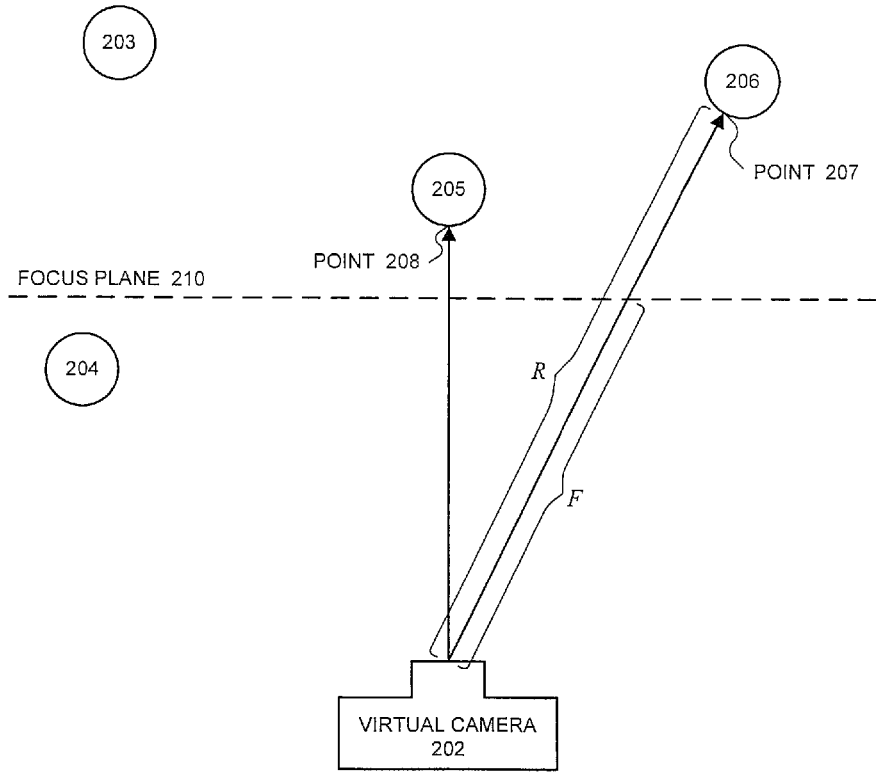
FIG. 2 illustrates how a virtual camera is modeled in accordance with an embodiment of the present invention.

FIG. 2 illustrates how a virtual camera 202 is modeled in accordance with an embodiment of the present invention. In FIG. 2, a virtual camera 202 captures an image of a number of objects 203-206. Note that the virtual camera is associated with a focus plane 210. Objects that are located on (or near) focus plane 210 will appear in-focus, whereas objects that are located far away from the focus plane 210 will appear out-of-focus.

In determining the contribution of a point 207 on object 206 to the resulting defocused image, the system considers the distance R from the virtual camera 202 to point 207. The system also considers the distance F to the focus plane 210 along a ray that extends from virtual camera 202 to the point 207.

When determining whether the blurring of point 207 will influence the appearance of a point 208 on another object 205, the system considers the pixel-offset distance D within the image between point 207 and point 208.

Kernel-Based Technique

Figure 3:
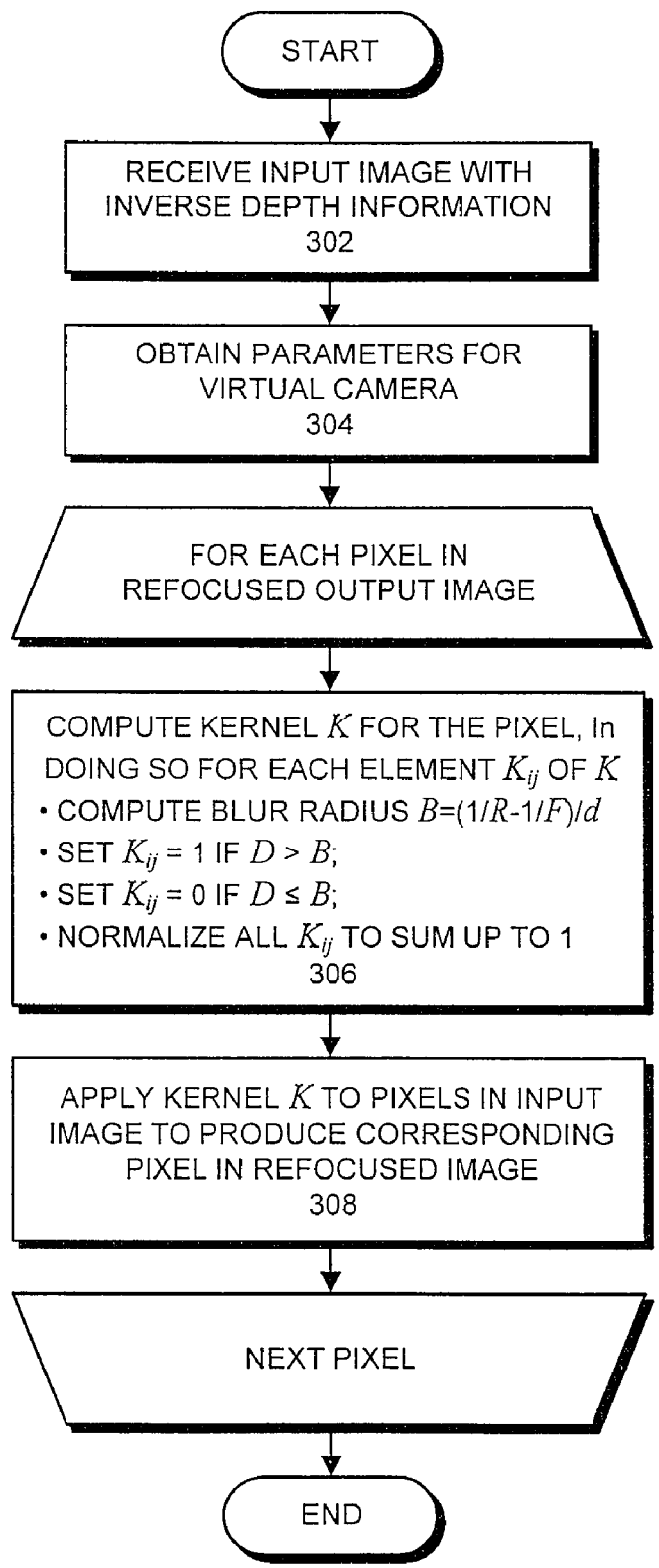
FIG. 3 presents a flow chart illustrating the process of refocusing an image in accordance with an embodiment of the present invention.

One embodiment of the present invention provides a system that uses an N×N kernel to perform "refocusing" (also called "defocusing") operations. Referring to the flow chart illustrated in FIG. 3, the system operates as follows. First, the system receives an input image 102, which includes an "inverse-depth" value 1/R for each pixel (step 302). This inverse-depth value can be received in the form of a gray-scale image (a channel), and the depth value R can be calculated by anyone of a number of existing stereo or multiple view geometry techniques. If necessary, the system converts a depth value R for each pixel into an inverse depth value 1/R.

The system also obtains parameters for virtual camera 202 (step 304), which for example specify the depth-of-field d for virtual camera 202, as well as the location of the focus plane for virtual camera 202.

Next, the system computes each pixel in the refocused output image by performing the following operations. First, the system computes a kernel K for the pixel (step 306). Each element $K_{ij}$ of kernel K is computed by obtaining the inverse depth 1/R of the underlying image pixel and the inverse distance to the focus plane 1/F (as is illustrated in FIG. 2 above). Next, the system calculates a "blur radius" B=(1/R−1/F)ld for the pixel, where d is a user-supplied depth-of-field value. At this point, B can be scaled with a global factor.

Now, the system determines (for example, by using a table lookup) the distance D within the image from point ij to the central point in the kernel K. If D>B, the system assigns the value 0 to $K_{ij}$, because in this case we are too far from the pixel for the blur to influence our final result. One the other hand, if D≦B, the system assigns the value 1 to $K_{ij}$. (Note that this assumes a constant weight for all pixels of the kernel.) In the end, the system normalizes the elements of the kernel K to add up to 1.

Depending on the value of d, objects in front of (and a little off) the object in focus may or may not influence pixel values of the object in focus. But objects behind (further away than) the object in focus do not influence pixel values of that object because B is negative, but they still appear blurred.

In another embodiment of the present invention, we build the exact kernel function, not just 0 and 1 as we assumed above. A simple form of this embodiment assumes the virtual camera is looking at one shining point. If the virtual camera is focused at F=∞, the virtual camera will see a flat, constant-intensity, white disk. If we refocus the virtual camera to a new F, the disk is no longer flat.

Next, after the kernel K is computed, the system applies the kernel K to pixels in input image 102 to produce refocused image 108 (step 308).

Note that by determining whether the radial distance D is greater than the blur radius B, the above-described embodiment produces a refocused image which is consistent with a round camera aperture. Other embodiments of the present invention perform other geometric comparisons, not simply radial distance, to produce images which are consistent with apertures having different shapes.

In an alternative embodiment of the present invention, we do not construct a kernel at all, but simply add up all pixels selected by the above technique. This alternative embodiment is described in more detail below.

Alternative Embodiment of the Refocusing Process

Figure 4:
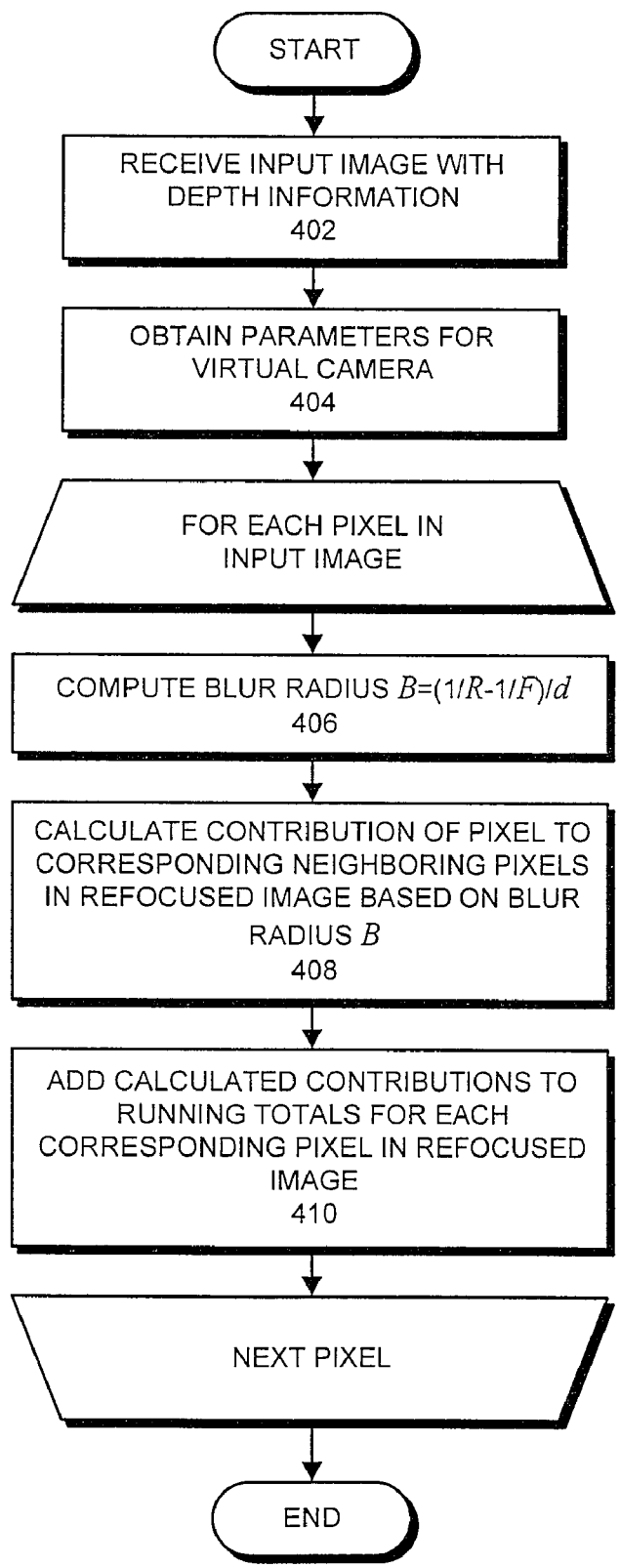
FIG. 4 presents a flow chart illustrating an alternative technique for refocusing an image in accordance with another embodiment of the present invention.

FIG. 4 presents a flow chart illustrating an alternative technique for refocusing an image in accordance with another embodiment of the present invention. As in the kernel-based technique described above, the system first receives an input image 102, which includes an "inverse-depth" value 1/R for each pixel (step 402), and also obtains parameters for virtual camera 202 (step 404). Next, for each pixel in input image 102, the system calculates a blur radius B=(1/R−1/F)/d (step 406). The system then calculates the contribution of this "source" pixel from the input image to corresponding neighboring pixels in the refocused image based on the blur radius B (step 408). In one embodiment of the present invention, the contribution of a source pixel in the input image to a given neighboring pixel in the refocused image is the color value of the source pixel multiplied by s/S, wherein s is the area of a single pixel and S is the total area covered by the blur radius B.

Next, the system adds these calculated contributions to running totals which are maintained for each corresponding neighboring pixel in the refocused image (step 410). At the start of this process, the running totals for all pixels are initialized to zero. When the contribution of a given source pixel in the input image is calculated, this contribution is added to the running total for each corresponding neighboring pixel in the refocused image which is within the blur radius of the source pixel. After the contribution for each source pixel in the input image is calculated and added to the running totals of its corresponding neighboring pixels in the refocused image, the process is compete.

Note that this alternative embodiment eliminates redundant computations because the blur radius is calculated only once for each pixel, as opposed to the kernel-based technique, which re-computes the blur radius for each pixel whenever the pixel is associated with a different kernel.

Black Hole Problem

There is a problem with the above-described technique which has no perfect solution. If part of the scene is "hidden" behind some object that is close to the camera, then focusing far beyond that object produces a very large and "thin" fuzzy blur for that object, and most importantly a "black hole" at the invisible part of the scene behind the object. If the image was gathered using two cameras, we can partially solve this problem by blending the image with the same representation constructed from the second image, with appropriate coefficients, wherein the second image is warped appropriately based on the mesh. This blending with the right coefficients (which we calculate) can fix the problem for pixels that are visible from both cameras. It also partially fixes the problem for pixels that are visible from one camera only.

However, it does not fix the problem for pixels that are not visible from either camera. In this case, we can use a "depth healing brush" to fix the problem. Next is an explanation of what that means. First, the system assumes the "black hole" is in focus, i.e. it is at depth F. In more detail, the system first identifies the area of the black hole that needs to be filled in. This area is made up of all pixels that are closer than F in depth. (Note that the object at depth F at those pixels has never been observed because it is "covered" by pixels that are closer.) In that area, pixel values are calculated or "filled in" by solving the Laplace or Bilaplace equation with boundary conditions provided by surrounding pixels (at depth closest to F). (This is similar to the technique described in U.S. Pat. No. 6,587,592, entitled "Generating Replacement Data Values for an Image Region," by inventors Todor Georgiev et al.) Alternatively, they can be filled in by other "inpainting" techniques that base their output on the surroundings. The output of this process is written to a special buffer. This is essentially "the image at depth F". Those pixels are used in the above-described techniques of the present invention together with their inverse depth 1/F as if they are observed pixels.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
obtaining an input image of a scene and a depth value R for each pixel in the input image, where R for a pixel is distance from a virtual camera to the respective pixel;
obtaining parameters that specify a depth-of-field d and a focus plane for the virtual camera;
determining an area of the scene that is hidden behind one or more objects in the scene, wherein the one or more objects are closer to the virtual camera than the focus plane;
setting R for each pixel in the area to F, where F is distance from the virtual camera to the focus plane along a ray that extends from the virtual camera to the respective pixel;
calculating pixel values for the pixels in the area from pixel values of pixels in a region of the scene surrounding the area; and
refocusing the scene according to the depth values R for the pixels in the scene, the depth-of-field d, and the focus plane to generate a refocused image of the scene.

2. The computer-implemented method as recited in claim 1, wherein said determining an area of the scene that is hidden behind one or more objects in the scene comprises determining one or more pixels in the scene for which the depth value R is less than F, where F is distance from the virtual camera to the focus plane along a ray that extends from the virtual camera to a given pixel.

3. The computer-implemented method as recited in claim 1, wherein said calculating pixel values for the pixels in the area from pixel values of pixels in a region of the scene surrounding the area comprises applying a Laplace or Bilaplace equation to the pixels in the area with boundary conditions provided by the pixels in the region of the scene surrounding the area.

4. The computer-implemented method as recited in claim 1, wherein refocusing the scene comprises, for each pixel in the scene:
   determining a blur radius B for the pixel according to the depth value R for the pixel, the depth-of-field d, and the focus plane; and
   determining whether the pixel contributes to neighboring pixels in the refocused image of the scene according to the blur radius B for the pixel and distance from the pixel to the neighboring pixels.

5. The computer-implemented method as recited in claim 4, wherein said determining the blur radius B for the pixel comprises calculating B for the pixel by computing $B=(1/R-1/F)/d$, where F is distance from the virtual camera to the focus plane along a ray that extends from the virtual camera to the pixel.

6. The computer-implemented method as recited in claim 4, wherein refocusing the scene further comprises, for each pixel in the scene:
   generating a kernel K for the pixel, wherein the kernel K uses the blur radius of neighboring pixels to determine whether the neighboring pixels contribute to the pixel; and
   applying the kernel K to the pixel and the neighboring pixels in the input image of the scene to render the pixel in the refocused image of the scene.

7. The computer-implemented method as recited in claim 4, wherein refocusing the scene further comprises, for each pixel in the scene:
   calculating the contribution of the pixel in the input image of the scene to corresponding neighboring pixels in the refocused image of the scene according to the blur radius B of the pixel; and
   adding the calculated contributions of the pixel in the input image of the scene to a running total maintained for each corresponding neighboring pixel in the refocused image of the scene.

8. A non-transitory computer-readable storage medium storing program instructions, wherein the program instructions are computer-executable to implement:
   obtaining an input image of a scene and a depth value R for each pixel in the input image, where R for a pixel is distance from a virtual camera to the respective pixel;
   obtaining parameters that specify a depth-of-field d and a focus plane for the virtual camera;
   determining an area of the scene that is hidden behind one or more objects in the scene, wherein the one or more objects are closer to the virtual camera than the focus plane;
   setting R for each pixel in the area to F, where F is distance from the virtual camera to the focus plane along a ray that extends from the virtual camera to the respective pixel;
   calculating pixel values for the pixels in the area from pixel values of pixels in a region of the scene surrounding the area; and
   refocusing the scene according to the depth values R for the pixels in the scene, the depth-of-field d, and the focus plane to generate a refocused image of the scene.

9. The computer-readable storage medium as recited in claim 8, wherein, in said determining an area of the scene that is hidden behind one or more objects in the scene, the program instructions are computer-executable to implement determining one or more pixels in the scene for which the depth value R is less than F, where F is distance from the virtual camera to the focus plane along a ray that extends from the virtual camera to a given pixel.

10. The computer-readable storage medium as recited in claim 8, wherein, in said calculating pixel values for the pixels in the area from pixel values of pixels in a region of the scene surrounding the area, the program instructions are computer-executable to implement applying a Laplace or Bilaplace equation to the pixels in the area with boundary conditions provided by the pixels in the region of the scene surrounding the area.

11. The computer-readable storage medium as recited in claim 8, wherein, in said refocusing the scene, the program instructions are computer-executable to implement, for each pixel in the scene:
   determining a blur radius B for the pixel according to the depth value R for the pixel, the depth-of-field d, and the focus plane; and
   determining whether the pixel contributes to neighboring pixels in the refocused image of the scene according to the blur radius B for the pixel.

12. The computer-readable storage medium as recited in claim 11, wherein, in said determining whether the pixel contributes to a given neighboring pixel in the refocused image of the scene, the program instructions are computer-executable to implement:
   determining a distance D from the pixel to the given neighboring pixel;
   if $D>B$, determining that the pixel does not contribute to the given neighboring pixel; and
   if $D \leq B$, determining that the pixel contributes to the given neighboring pixel.

13. The computer-readable storage medium as recited in claim 11, wherein, in said refocusing the scene, the program instructions are further computer-executable to implement, for each pixel in the scene:
   generating a kernel K for the pixel, wherein the kernel K uses the blur radius of neighboring pixels to determine whether the neighboring pixels contribute to the pixel; and
   applying the kernel K to the pixel and the neighboring pixels in the input image of the scene to render the pixel in the refocused image of the scene.

14. The computer-readable storage medium as recited in claim 11, wherein, in said refocusing the scene, the program instructions are computer-executable to implement, for each pixel in the scene:
   calculating the contribution of the pixel in the input image of the scene to corresponding neighboring pixels in the refocused image of the scene according to the blur radius B of the pixel; and
   adding the calculated contributions of the pixel in the input image of the scene to a running total maintained for each corresponding neighboring pixel in the refocused image of the scene.

15. A computer comprising a computer-readable storage medium storing instructions that when executed by the computer cause the computer to implement a refocusing module configured to:

obtain an input image of a scene and a depth value R for each pixel in the input image, where R for a pixel is distance from a virtual camera to the respective pixel; and obtain parameters that specify a depth-of-field d and a focus plane for the virtual camera;

determine an area of the scene that is hidden behind one or more objects in the scene, wherein the one or more objects are closer to the virtual camera than the focus plane;

set R for each pixel in the area to F, where F is distance from the virtual camera to the focus plane along a ray that extends from the virtual camera to the respective pixel;

calculate pixel values for the pixels in the area from pixel values of pixels in a region of the scene surrounding the area; and refocus the scene according to the depth values R for the pixels in the scene, the depth-of-field d, and the focus plane to generate a refocused image of the scene.

16. The computer as recited in claim 15, wherein, to determine an area of the scene that is hidden behind one or more objects in the scene, the refocusing module is configured to determine one or more pixels in the scene for which the depth value R is less than F, where F is distance from the virtual camera to the focus plane along a ray that extends from the virtual camera to a given pixel.

17. The computer as recited in claim 15, wherein, to calculate pixel values for the pixels in the area from pixel values of pixels in a region of the scene surrounding the area, the refocusing module is configured to apply a Laplace or Bilaplace equation to the pixels in the area with boundary conditions provided by the pixels in the region of the scene surrounding the area.

18. The computer as recited in claim 15, wherein, to refocus the scene, the refocusing module is configured to, for each pixel in the scene:

determine a blur radius B for the pixel according to the depth value R for the pixel, the depth-of-field d, and the focus plane; and determine whether the pixel contributes to neighboring pixels in the refocused image of the scene according to the blur radius B for the pixel and distance from the pixel to the neighboring pixels.

19. The computer as recited in claim 18, wherein, to refocus the scene, the refocusing module is further configured to, for each pixel in the scene:

generate a kernel K for the pixel, wherein the kernel K uses the blur radius of neighboring pixels to determine whether the neighboring pixels contribute to the pixel; and apply the kernel K to the pixel and the neighboring pixels in the input image of the scene to render the pixel in the refocused image of the scene.

20. The computer as recited in claim 18, wherein, to refocus the scene, the refocusing module is further configured to, for each pixel in the scene:

calculate the contribution of the pixel in the input image of the scene to corresponding neighboring pixels in the refocused image of the scene according to the blur radius B of the pixel; and add the calculated contributions of the pixel in the input image of the scene to a running total maintained for each corresponding neighboring pixel in the refocused image of the scene.

* * * * *